US012676752B2

(12) United States Patent
Tsai et al.

(10) Patent No.: US 12,676,752 B2
(45) Date of Patent: Jul. 7, 2026

(54) ONLINE SIGNATURE SYSTEM, METHOD AND ELECTRONIC APPARATUS

(71) Applicant: KDAN MOBILE SOFTWARE LTD., Tainan City (TW)

(72) Inventors: Chang-Zhou Tsai, Tainan City (TW); Yu-Sheng Wang, Tainan City (TW); Nan-Kuang Lee, Tainan City (TW)

( * ) Notice: Subject to any disclaimer, the term of this patent is extended or adjusted under 35 U.S.C. 154(b) by 542 days.

(21) Appl. No.: 17/975,551

(22) Filed: Oct. 27, 2022

(65) Prior Publication Data

US 2023/0133618 A1     May 4, 2023

Related U.S. Application Data

(60) Provisional application No. 63/272,694, filed on Oct. 28, 2021.

(51) Int. Cl.
*H04L 9/32*       (2006.01)
*H04L 65/1089*     (2022.01)
(Continued)

(52) U.S. Cl.
CPC ........ H04L 9/3247 (2013.01); H04L 65/1089 (2013.01); H04L 65/1093 (2013.01); H04L 65/402 (2022.05)

(58) Field of Classification Search
CPC ............... H04L 63/0823; H04L 63/123; H04L 65/1069; H04L 65/1089; H04L 65/1093;
(Continued)

(56) References Cited

U.S. PATENT DOCUMENTS 7,167,844 B1 * 1/2007 Leong .................. G06Q 50/188
705/37
7,751,347 B2 * 7/2010 Giroti ..................... H04L 12/66
370/260
(Continued)

FOREIGN PATENT DOCUMENTS

CN          101419686          4/2009
TW          M549393           9/2017
(Continued)

OTHER PUBLICATIONS

"Office Action of Taiwan Counterpart Application", issued on May 10, 2023, p. 1-p. 19.

*Primary Examiner* — Sharon S Lynch
(74) *Attorney, Agent, or Firm* — OPES IP Consulting Co., Ltd.

(57)          ABSTRACT

An online signature system, method, and an electronic apparatus are provided. Through a remote conference server, an electronic apparatus and another electronic apparatus perform a remote communication procedure. In a process of performing the remote communication procedure, a signature task is transmitted to the electronic apparatus through the remote conference server. The electronic apparatus is connected to an electronic signature server based on the signature task, and displays an assignment file transmitted by the electronic signature server on a display. In response to receiving a signature object associated with the assignment file, the signature object is transmitted to the electronic signature server, so that the electronic signature server combines the signature object with the assignment file to obtain a signed file.

25 Claims, 4 Drawing Sheets

(51) Int. Cl.
　　*H04L 65/1093*　　(2022.01)
　　*H04L 65/402*　　(2022.01)

(58) Field of Classification Search
　　CPC ... H04L 65/402; H04L 65/403; H04L 9/3247;
　　　　　　　　　　　　　　　　　　　H04L 9/50
　　See application file for complete search history.

(56)　　　　　　　References Cited

U.S. PATENT DOCUMENTS

| | | | | |
|---|---|---|---|---|
| 9,698,992 | B2 * | 7/2017 | Gertner | H04L 63/123 |
| 9,866,393 | B1 * | 1/2018 | Rush | H04L 9/3236 |
| 9,984,242 | B2 * | 5/2018 | Follis | G06Q 10/103 |
| 10,110,385 | B1 * | 10/2018 | Rush | H04L 9/3234 |
| 10,146,825 | B2 * | 12/2018 | Almgren | G06F 21/64 |
| 10,430,515 | B1 * | 10/2019 | Ohme | G06F 40/171 |
| 10,855,732 | B2 * | 12/2020 | Aggarwal | H04L 65/403 |
| 11,119,649 | B1 * | 9/2021 | Sahgal | G06F 16/93 |
| 11,538,122 | B1 * | 12/2022 | Rakowicz | G06Q 20/3829 |
| 11,582,421 | B2 * | 2/2023 | Rung | H04L 12/1813 |
| 11,750,670 | B2 * | 9/2023 | Aggarwal | G06F 40/174 |
| | | | | 715/753 |
| 11,757,654 | B2 * | 9/2023 | Eliezer | G06F 21/10 |
| | | | | 713/176 |
| 11,900,491 | B2 * | 2/2024 | Gibson | G06Q 50/18 |
| 12,015,616 | B2 * | 6/2024 | Broadworth | H04L 63/102 |
| 12,133,021 | B2 * | 10/2024 | Rung | H04L 65/403 |
| 2002/0029350 | A1 * | 3/2002 | Cooper | H04L 65/403 |
| | | | | 705/1.1 |
| 2003/0070072 | A1 * | 4/2003 | Nassiri | H04L 9/3247 |
| | | | | 713/168 |
| 2004/0034723 | A1 * | 2/2004 | Giroti | H04L 12/66 |
| | | | | 710/8 |
| 2005/0243199 | A1 * | 11/2005 | Bohaker | H04N 1/00562 |
| | | | | 348/373 |
| 2007/0079128 | A1 * | 4/2007 | Cheng | G06Q 10/00 |
| | | | | 713/176 |
| 2008/0072334 | A1 * | 3/2008 | Bailey | G06Q 10/10 |
| | | | | 726/28 |
| 2008/0148054 | A1 * | 6/2008 | Cahill | G06F 21/64 |
| | | | | 713/180 |
| 2008/0209516 | A1 * | 8/2008 | Nassiri | G06F 21/64 |
| | | | | 726/3 |
| 2009/0049298 | A1 * | 2/2009 | Hatter | H04L 9/3231 |
| | | | | 713/176 |
| 2011/0047385 | A1 * | 2/2011 | Kleinberg | H04L 9/321 |
| | | | | 713/176 |
| 2013/0046991 | A1 * | 2/2013 | Lu | H04L 9/3247 |
| | | | | 713/176 |
| 2013/0185565 | A1 * | 7/2013 | Appelbaum | G06Q 40/08 |
| | | | | 713/176 |
| 2013/0262992 | A1 * | 10/2013 | He | G06Q 50/18 |
| | | | | 715/255 |
| 2015/0288672 | A1 * | 10/2015 | Patten | H04L 67/1095 |
| | | | | 726/28 |
| 2016/0048696 | A1 * | 2/2016 | Follis | G06F 21/645 |
| | | | | 726/28 |
| 2016/0182237 | A1 * | 6/2016 | Almgren | H04L 9/321 |
| | | | | 713/155 |
| 2017/0048285 | A1 * | 2/2017 | Pearl | G06F 16/11 |
| 2017/0200244 | A1 * | 7/2017 | Aggarwal | H04L 51/52 |
| 2017/0272249 | A1 * | 9/2017 | Bhandarkar | H04L 9/3247 |
| 2017/0345394 | A1 * | 11/2017 | Bansal | H04L 63/0838 |
| 2018/0113845 | A1 * | 4/2018 | Aggarwal | H04L 65/403 |
| 2018/0129827 | A1 * | 5/2018 | Picazo | G06F 21/64 |
| 2019/0036864 | A1 * | 1/2019 | Reuss | H04W 12/108 |
| 2019/0354706 | A1 * | 11/2019 | Bartlett | G16H 10/60 |
| 2019/0362430 | A1 * | 11/2019 | Jass | G06Q 40/08 |
| 2019/0386833 | A1 * | 12/2019 | Alger | H04L 9/3239 |
| 2020/0076612 | A1 * | 3/2020 | Adluri | G06Q 10/10 |
| 2020/0301979 | A1 * | 9/2020 | Alexiades | G06F 16/93 |
| 2020/0372202 | A1 * | 11/2020 | Hayslett | H04L 9/3247 |
| 2020/0404029 | A1 * | 12/2020 | Aggarwal | G06F 40/174 |
| 2021/0014454 | A1 * | 1/2021 | Rung | H04L 65/4025 |
| 2021/0211299 | A1 * | 7/2021 | Hussain | H04L 9/3213 |
| 2021/0250359 | A1 * | 8/2021 | Yaacoby | H04L 63/0428 |
| 2022/0164480 | A1 * | 5/2022 | Chavarria Gutierrez | |
| | | | | H04L 9/3231 |
| 2022/0247566 | A1 * | 8/2022 | Krosuri | H04L 9/0894 |
| 2023/0038949 | A1 * | 2/2023 | Kido | G06F 21/73 |
| 2023/0117628 | A1 * | 4/2023 | Giffard-Burley | G06F 21/64 |
| | | | | 707/736 |
| 2023/0146348 | A1 * | 5/2023 | Yu | H04L 9/3247 |
| | | | | 713/180 |
| 2024/0169457 | A1 * | 5/2024 | Gibson | G06F 21/31 |

FOREIGN PATENT DOCUMENTS

| | | |
|---|---|---|
| TW | 201923645 | 6/2019 |
| TW | 201933054 | 8/2019 |
| TW | I673623 | 10/2019 |
| TW | 202119787 | 5/2021 |

* cited by examiner

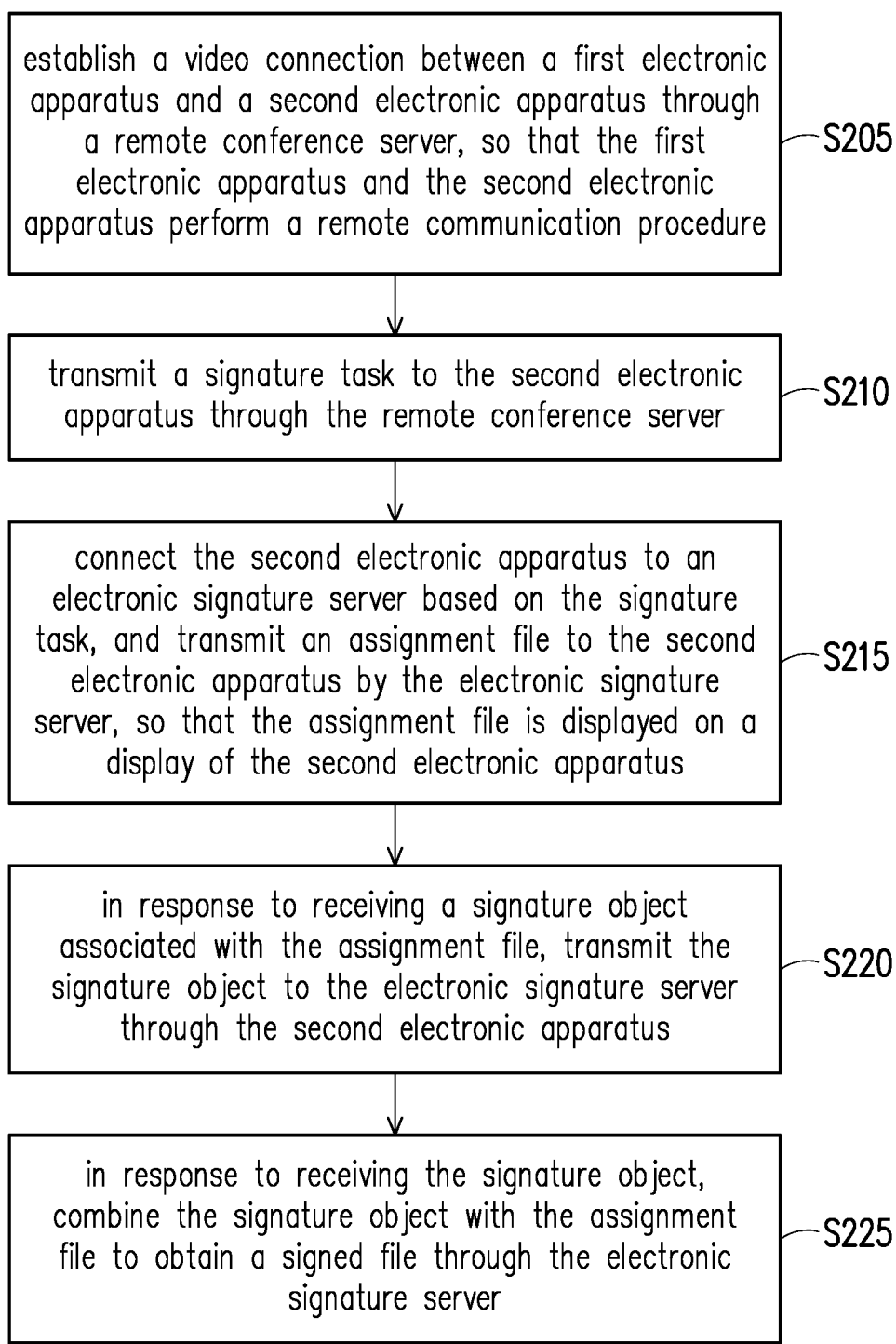

establish a video connection between a first electronic apparatus and a second electronic apparatus through a remote conference server, so that the first electronic apparatus and the second electronic apparatus perform a remote communication procedure ⌐S205 transmit a signature task to the second electronic apparatus through the remote conference server ⌐S210 connect the second electronic apparatus to an electronic signature server based on the signature task, and transmit an assignment file to the second electronic apparatus by the electronic signature server, so that the assignment file is displayed on a display of the second electronic apparatus ⌐S215 in response to receiving a signature object associated with the assignment file, transmit the signature object to the electronic signature server through the second electronic apparatus ⌐S220 in response to receiving the signature object, combine the signature object with the assignment file to obtain a signed file through the electronic signature server ⌐S225

FIG. 2

ONLINE SIGNATURE SYSTEM, METHOD AND ELECTRONIC APPARATUS

CROSS-REFERENCE TO RELATED APPLICATION

This application claims the priority benefit of U.S. provisional application Ser. No. 63/272,694, filed on Oct. 28, 2021. The entirety of the above-mentioned patent application is hereby incorporated by reference herein and made a part of this specification.

BACKGROUND

Technical Field

The disclosure relates to electronic signature technology, and more particularly, to an online signature system, method, and an electronic apparatus.

Description of Related Art

With the development of global e-commerce, many transactions are no longer limited to physical documents, and conventional paper documents are slowly being replaced by electronic files. In the case of paying attention to work efficiency, modes such as conventional handwritten signatures and stamps may no longer meet the requirements of the electronic age, thereby deriving the electronic signature technology. The electronic signature technology replaces the mode of conventional signatures with a pen on paper, allowing users to sign the electronic files on an electronic apparatus.

However, general electronic signature methods are often limited by the lack of software and hardware of a client apparatus, and good electronic signature results may not be obtained, such as insufficient resolution of signature strokes or insufficient fluency when signing. Therefore, how to enable the users to obtain the good electronic signature results in existing hardware and software architectures is one of the current issues to be solved.

SUMMARY

The disclosure provides an online signature system, method, and an electronic apparatus, which integrates the video technology and the electronic signature technology, and solves the situation of highly relying on face-to-face signing.

An online signature system in the disclosure includes an electronic signature server and a remote conference server configured to establish a video connection between a first electronic apparatus and a second electronic apparatus, so that the first electronic apparatus and the second electronic apparatus perform a remote communication procedure. In a process of performing the remote communication procedure, the remote conference server transmits a signature task to the second electronic apparatus. The second electronic apparatus is connected to the electronic signature server based on the signature task, and the electronic signature server transmits an assignment file to the second electronic apparatus, so that the assignment file is displayed on a display of the second electronic apparatus. In response to receiving a signature object associated with the assignment file, the second electronic apparatus transmits the signature object to the electronic signature server. In response to receiving the signature object, the electronic signature server combines the signature object with the assignment file to obtain a signed file.

An online signature method in the disclosure includes the following. A video connection is established between a first electronic apparatus and a second electronic apparatus through a remote conference server, so that the first electronic apparatus and the second electronic apparatus perform a remote communication procedure. In a process of performing the remote communication procedure, a signature task is transmitted to the second electronic apparatus through the remote conference server. The second electronic apparatus is connected to an electronic signature server based on the signature task, and an assignment file is transmitted to the second electronic apparatus by the electronic signature server, so that the assignment file is displayed on a display of the second electronic apparatus. In response to the second electronic apparatus receiving a signature object associated with the assignment file, the signature object is transmitted to the electronic signature server through the second electronic apparatus. The signature object is combined with the assignment file through the electronic signature server to obtain a signed file.

An electronic apparatus for an online signature in the disclosure includes a display, a storage, and a processor. The storage includes a client application. The processor is coupled to the storage. The processor is configured to execute the client application to be connected to a remote conference server, so that the electronic apparatus and another electronic apparatus perform a remote communication procedure through the remote conference server, receive a signature task from the remote conference server in a process of performing the remote communication procedure, be connected to an electronic signature server based on the signature task, and display an assignment file transmitted by the electronic signature server on the display, and in response to receiving a signature object associated with the assignment file, transmit the signature object to the electronic signature server, so that the electronic signature server combines the signature object with the assignment file to obtain a signed file.

An online signature method in the disclosure includes the following. A client application is executed through an electronic apparatus to perform the following. A remote conference server is connected, so that the electronic apparatus and another electronic apparatus perform a remote communication procedure through the remote conference server. A signature task is received from the remote conference server in a process of performing the remote communication procedure. An electronic signature server is connected based on the signature task, and an assignment file transmitted by the electronic signature server is displayed on a display. In response to receiving a signature object associated with the assignment file, the signature object is transmitted to the electronic signature server, so that the electronic signature server combines the signature object with the assignment file to obtain a signed file.

Based on the above, in the disclosure, through the integration of the video technology and the electronic signature technology, the electronic signature may be completed in the video process, providing a more convenient signature method.

BRIEF DESCRIPTION OF THE DRAWINGS

FIG. 2 is a flowchart of an online signature method according to an embodiment of the disclosure.

DETAILED DESCRIPTION OF DISCLOSED EMBODIMENTS

Figure 1:
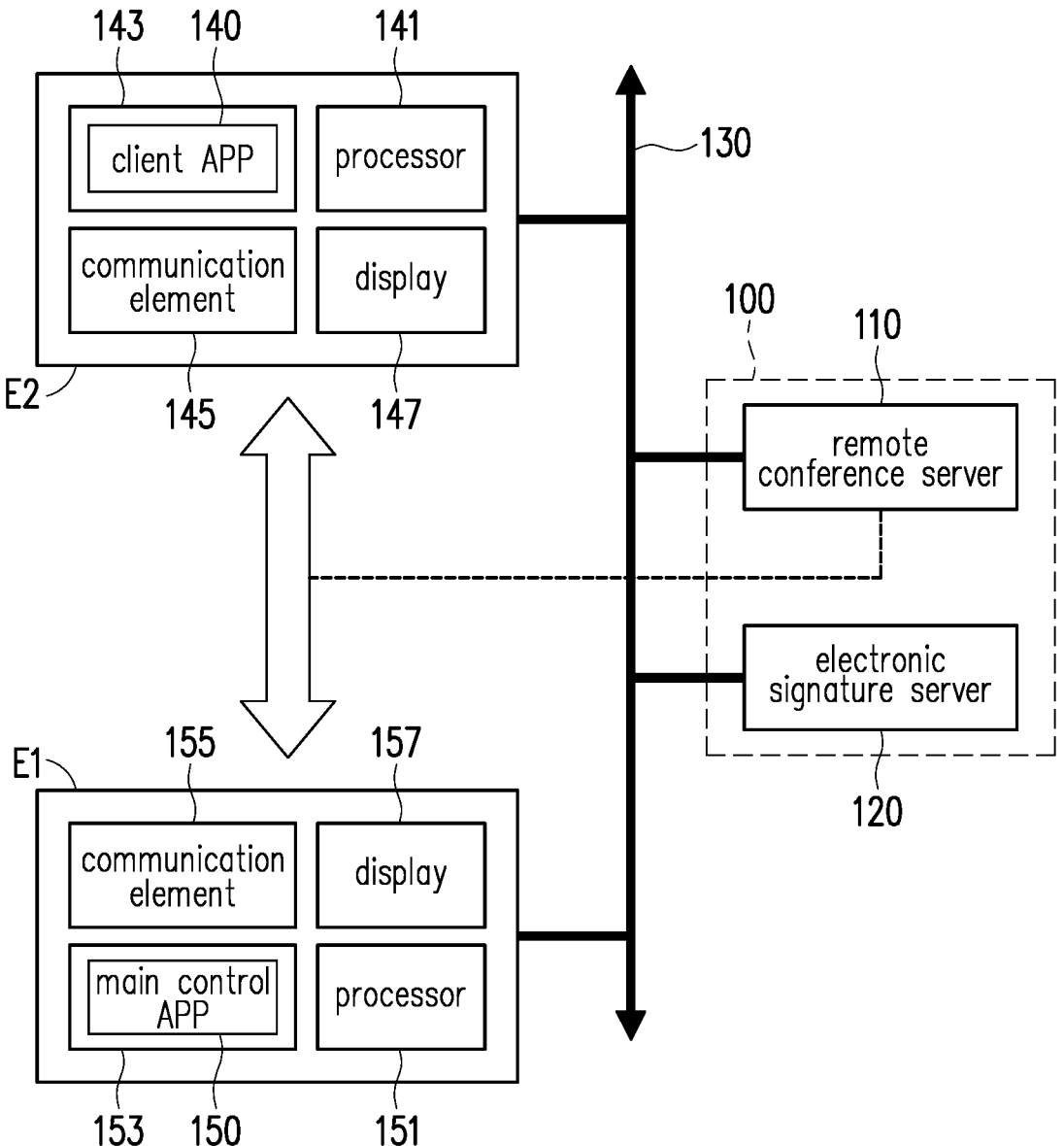
FIG. 1 is a schematic view of an architecture combining video technology and electronic signature technology according to an embodiment of the disclosure.

FIG. 1 is a schematic view of an architecture combining video technology and electronic signature technology according to an embodiment of the disclosure. Referring to FIG. 1, an online signature system 100 includes a remote conference server 110 and an electronic signature server 120. The remote conference server 110 and the electronic signature server 120 are electronic apparatuses with computing functions and networking functions, and provide external services through a network 130. The remote conference server 110 is configured to provide video connection services. The electronic signature server 120 is configured to provide electronic signature services.

The remote conference server 110 establishes a video connection between a first electronic apparatus E1 and a second electronic apparatus E2 through the network 130, so that the first electronic apparatus E1 and the second electronic apparatus E2 perform a remote communication procedure. In addition, in other embodiments, the remote conference server 110 may also establish the video connection between the first electronic apparatus E1 and the second electronic apparatuses E2 at the same time.

In this embodiment, the remote conference server 110 provides two applications (APPs), namely, a client APP 140 and a main control APP 150 for users with different usage authorities to use. The main control APP 150 is used by a main controller (for example, used by a salesperson to indicate a signature task to be signed), and the client APP 140 is used by general users (i.e., signers).

When the first electronic apparatus E1 is an apparatus used by the main controller, and the second electronic apparatus E2 is an apparatus used by the general users, the main control APP 150 is installed in the first electronic apparatus E1, and the client APP 140 is installed in the second electronic apparatus E2.

The first electronic apparatus E1 includes a processor 151, a storage 153, a communication element 155, and a display 157. The processor 151 is coupled to the storage 153, the communication element 155, and the display 157. The storage 153 includes the main control APP 150.

The second electronic apparatus E2 includes a processor 141, a storage 143, a communication element 145, and a display 147. The processor 141 is coupled to the storage 143, the communication element 145, and the display 147. The storage 143 includes the client APP 140.

The processors 141 and 151 are, for example, central processing units (CPUs), physics processing units (PPUs), programmable microprocessors, embedded control chips, digital signal processors (DSPs), application specific integrated circuits (ASICs), or other similar apparatuses.

The storages 143 and 153 are, for example, any type of fixed or removable random access memory (RAM), read-only memory (ROM), flash memory, hard disk, other similar apparatuses, or a combination of the apparatuses. In the second electronic apparatus E2, after the client APP 140 is installed, it is executed by the processor 141. In addition, in the first electronic apparatus E1, after the main control APP 150 is installed, it is executed by the processor 151.

The communication elements 145 and 155 may be chips or circuits using local area network (LAN) technology, wireless LAN (WLAN) technology, or mobile communication technology. A local area network is, for example, Ethernet. A wireless area network is, for example, Wi-Fi. The mobile communication technology is, for example, a global system for mobile communications (GSM), third-generation (3G) mobile communication technology, fourth-generation (4G) mobile communication technology, fifth-generation (5G) mobile communication technology, etc.

The displays 147 and 157 are, for example, liquid crystal displays (LCDs), plasma displays, organic light-emitting diode (OLED) displays, etc.

In addition, both the remote conference server 110 and the electronic signature server 120 have components such as the processor, the storage, and the communication element (similar to the constitution of the above processors 141 and 151, the storages 143 and 153, and the communication elements 145 and 155).

FIG. 2 is a flowchart of an online signature method according to an embodiment of the disclosure. Referring to FIG. 2, in step S205, through the video connection between the first electronic apparatus E1 and the second electronic apparatus E2 established by the remote conference server 110, the first electronic apparatus E1 and the second electronic apparatus E2 perform the remote communication procedure. Specifically, the first electronic apparatus E1 and the second electronic apparatus E2 are respectively connected to the network 130 through the communication element 155 and the communication element 145 to establish the video connection through the remote conference server 110. Furthermore, in this embodiment, the video connection is a peer-to-peer (P2P) video connection. After the remote conference server 110 establishes the video connection, video data is directly transmitted by the first electronic apparatus E1 and the second electronic apparatus E2 through the network 130 without going through the remote conference server 110.

Next, in step S210, in a process of performing the remote communication procedure, the remote conference server 110 transmits the signature task to the second electronic apparatus E2. Here, the first electronic apparatus E1 may be connected to the remote conference server 110 through the main control APP 150 to assign the signature task in advance. In the process of performing the remote communication procedure, since the second electronic apparatus E2 has been connected to the remote conference server 110 through the client APP 140, the remote conference server 110 may transmit the signature task to the second electronic apparatus E2 accordingly.

Afterwards, in step S215, the second electronic apparatus E2 is connected to the electronic signature server 120 based on the signature task, and the electronic signature server 120 transmits an assignment file to the second electronic apparatus E2, so that the assignment file is displayed on the display 147 of the second electronic apparatus E2. Here, the assignment file may be a file image, an entire electronic file, or a file in any file format. For example, the signature task may be implemented by using a uniform resource locator (URL) address. After the client APP 140 displays the URL address on the display 147, the signer may click on the URL address through a mouse, a touch panel, a handwriting panel, etc. to enable the signature task accordingly.

Next, in step S220, the second electronic apparatus E2 transmits a signature object to the electronic signature server 120 in response to receiving the signature object associated with the assignment file. For example, the second electronic apparatus E2 receives an input through an input unit (such as the handwriting panel, the touch panel, or an image capturing apparatus) to generate the signature object. For example, in a case of using the handwriting panel or the touch panel for the input, the obtained signature object is a handwritten signature track. In a case of using the image capturing apparatus to for the input, the obtained signature object is a seal image or a handwritten signature image. After the second electronic apparatus E2 receives the signature object, the processor 141 transmits the signature object to the electronic signature server 120 through the network 130.

Then, in step S225, in response to receiving the signature object, the electronic signature server 120 combines the signature object with the assignment file to obtain a signed file. For example, the electronic signature server 120 merges the signature object into an assigned position of the assignment file.

The online signature system 100 may be applied to situations requiring signatures such as the securities business and insurance business. The salesperson may use the first electronic apparatus E1 (or other electronic apparatuses) to log in to the electronic signature server 120 in advance to upload a contract template to the electronic signature server 120. The contract template includes a template number, signature field, signature sequence, contract content field, etc. In addition, a document database 160 (refer to FIG. 4) may be further disposed in the online signature system 100 for the salesperson to upload signature-related data to the document database 160 in advance. The signature-related data includes a contract number, content of contract documents, etc.

Figure 3:
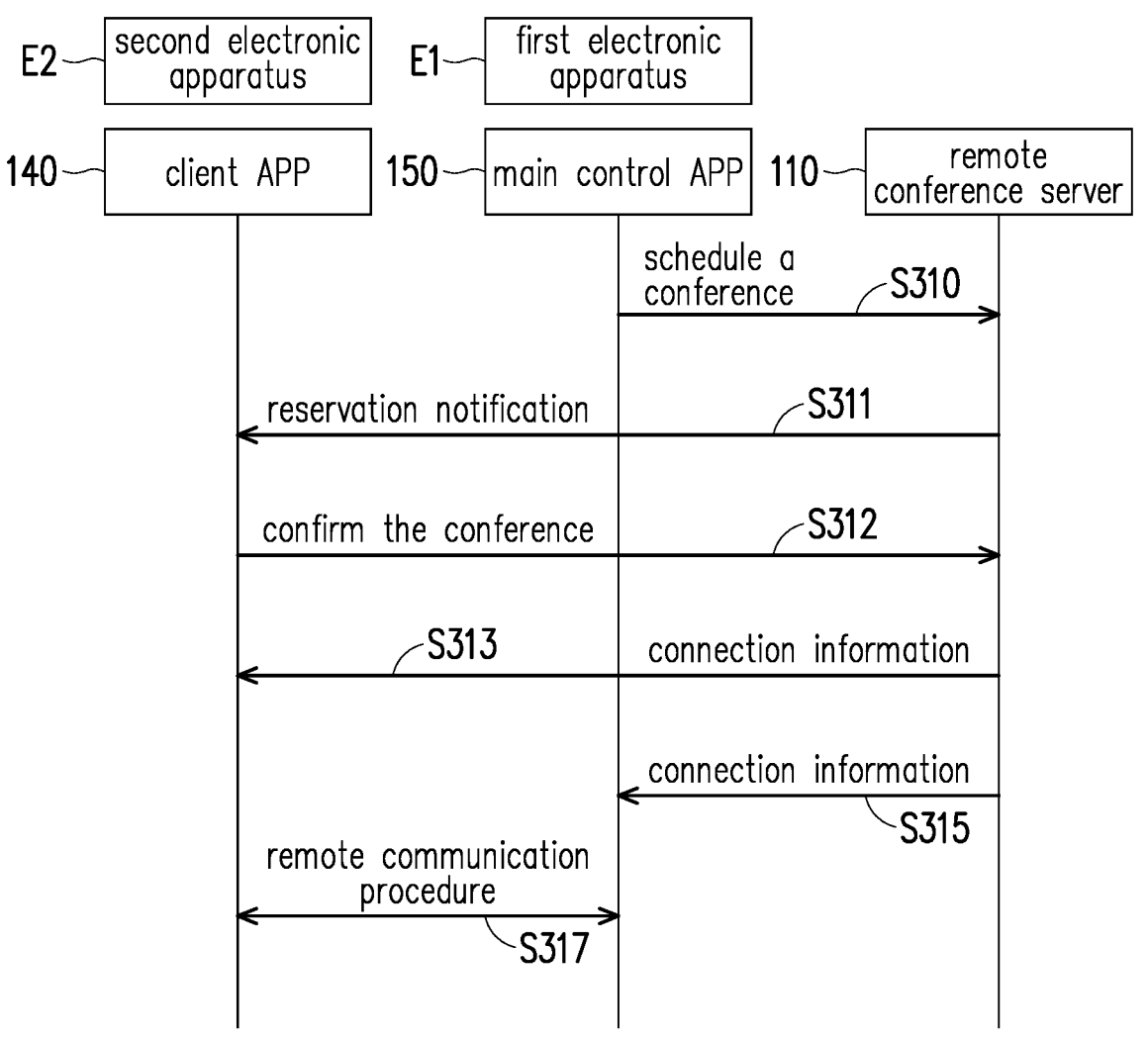
FIG. 3 is a schematic flowchart of establishing a remote communication procedure according to an embodiment of the disclosure.
Figure 4:
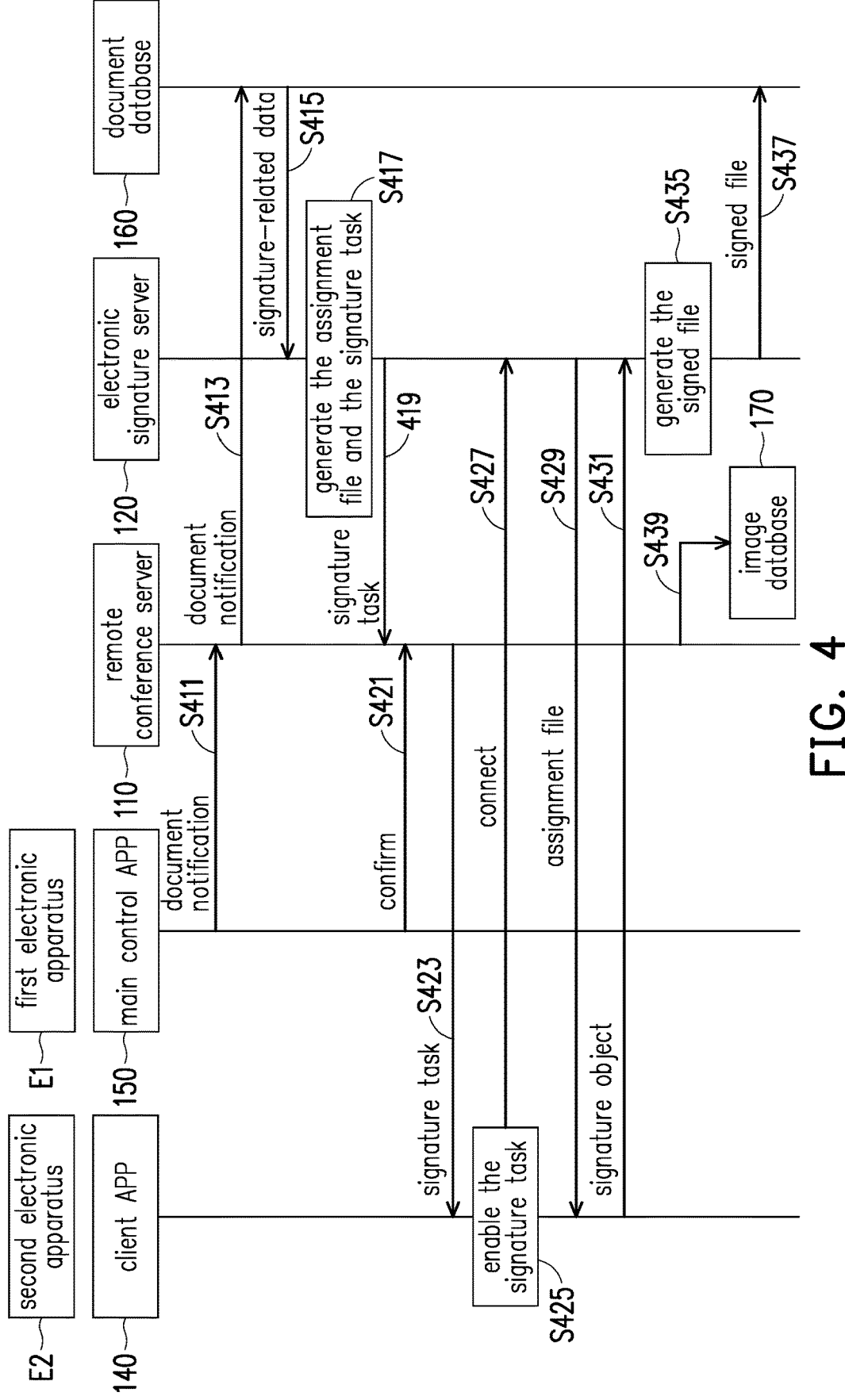
FIG. 4 is a schematic flowchart of an online signature method according to an embodiment of the disclosure.

Afterwards, the user may schedule a conference through the client APP 140, and perform the remote communication procedure with the salesperson through the client APP 140. In the process of performing the remote communication procedure, the assignment file is received through the client APP 140, and the signature object is transmitted to the electronic signature server 120 through the client APP 140. In the process of performing the remote communication procedure, the remote conference server 110 may further drive a capturing function of the client APP 140, so that the client APP 140 performs screen recording to obtain a conference video file. A more detailed description will be described below with FIGS. 3 and 4. FIG. 3 is a schematic flowchart of establishing a remote communication procedure according to an embodiment of the disclosure. FIG. 4 is a schematic flowchart of an online signature method according to an embodiment of the disclosure.

Referring to FIG. 3, in step 310, the first electronic apparatus E1 schedules the conference with the remote conference server 110 through the main control APP 150. For example, the first electronic apparatus E1 transmits a conference invitation to the remote conference server 110 through the main control APP 150. Next, in step S311, the remote conference server 110 transmits a reservation notification to the corresponding client APP 140 of the second electronic apparatus E2 according to the conference invitation of the first electronic apparatus E1. Afterwards, in step S312, the conference is confirmed to the remote conference server 110 through the client APP 140 of the second electronic apparatus E2. Then, in step S313 and step S315, the remote conference server 110 transmits connection information to the first electronic apparatus E1 and the second electronic apparatus E2 respectively. In step S317, the first electronic apparatus E1 performs the remote communication procedure through the main control APP 150 and the client APP 140 of the second electronic apparatus E2.

For example, before the salesperson is about to have a video conference with the user, the salesperson first sends the conference invitation to the remote conference server 110 through the main control APP 150 to make a reservation. After the reservation is made, the remote conference server 110 may transmit the connection information to the first electronic apparatus E1 and the second electronic apparatus E2 through a short message service or an email service. After receiving the connection information, the second electronic apparatus E2 performs the remote communication procedure through the client APP 140 and the main control APP 150 of the first electronic apparatus E1. The process of performing the remote communication procedure is shown in FIG. 4.

Referring to FIG. 4, in step S411, the first electronic apparatus E1 transmits a document notification to the remote conference server 110 through the main control APP 150. For example, the document notification includes an assigned product number to indicate the content of the contract. Next, in step S413, in response to receiving the document notification from the first electronic apparatus E1, the remote conference server 110 transmits the document notification to the document database 160.

In step S415, the document database 160 transmits the signature-related data corresponding to the document notification to the electronic signature server 120. For example, the signature-related data includes the content of the contract document and the corresponding template number. Next, in step S417, the electronic signature server 120 retrieves the corresponding contract template based on the signature-related data, generates the assignment file and the signature task accordingly, and transmits the signature task to the remote conference server 110. For example, the contract content field in the contract template is embedded into the content of the contract document to generate the assignment file. Here, the assignment file may be the file image (e.g., in a compression format such as JPG), the entire electronic file (e.g., in a portable document format (PDF), or the file in any file format.

In addition, the remote conference server 110 may further transmit a request for the signature task to the electronic signature server 120 in response to receiving the document notification from the first electronic apparatus E1. In response to receiving the signature task, the remote conference server 110 transmits the signature task to the first electronic apparatus E1 based on the request in step S419, so that in step S421, the signature task is confirmed through the main control APP 150 of the first electronic apparatus E1. Moreover, after the main control APP 150 confirms the signature task, in step S423, the remote conference server 110 transmits the signature task to the second electronic apparatus E2.

In addition, before the remote conference server 110 transmits the signature task to the second electronic apparatus E2, it may further perform identity verification on the signer. For example, the remote conference server 110 transmits a verification code to an assigned address through the short message service or the email service. In response to a response received from the second electronic apparatus E2 within an assigned time period conforming to the verification code, it is determined that an identity of the signer is correct, and the remote conference server 110 may transmit the signature task to the second electronic apparatus E2. If no response from the second electronic apparatus E2 is received within the assigned time period, or the received response does not conform to the verification code, it is determined that there is a problem with the identity of the signer. Therefore, the remote conference server 110 prohibits transmitting the signature task to the second electronic apparatus E2.

In addition, the identity verification of the signer may further include the following operation. The remote conference server 110 issues an instruction to the second electronic apparatus E2 to activate an image capturing function on the second electronic apparatus E2 (such as driving a camera of the second electronic apparatus E2) to obtain a verification image through the image capturing function. For example, the salesperson may issue the instruction through the main control APP 150 and send the instruction to the client APP 140 through the remote conference server 110. Through the instruction, the user of the second electronic apparatus E2 is required to provide an identity document in front of the camera for verification.

Afterwards, in step S425, the signature task is enabled by the second electronic apparatus E2. Here, in terms of implementing the signature task with the URL address, the client APP 140 displays a video interface for performing a video function on the display 147, and displays the URL address behind the video interface, so that the signer may click on the URL address through the mouse, the touch panel, the handwriting panel, etc. to enable the signature task accordingly.

After the signature task is enabled, in step S427, the second electronic apparatus E2 is connected to the electronic signature server 120 through the client APP 140. Afterwards, in step S429, the electronic signature server 120 transmits the assignment file to the second electronic apparatus E2 to present the assignment file through the video interface provided by the client APP 140 on the display 147.

Afterwards, in step S431, the second electronic apparatus E2 receives the input through the input unit to generate the signature object (the handwritten signature track, the seal image, or the handwritten signature image), and transmits the signature object to the electronic signature server 120.

In addition, the main control APP 150 of the first electronic apparatus E1 may be further set to as follows. On the display 157 of the first electronic apparatus E1, a dynamic image of a process of receiving the signature object through the client APP 140 in the second electronic apparatus E2 is displayed in real time. Afterwards, the main control APP 150 transmits the dynamic image to the remote conference server 110. The remote conference server 110 transmits the dynamic image and the conference video file to the electronic signature server 120, and associates the dynamic image, the conference video file, and the signed file through the electronic signature server 120.

In an embodiment, the remote conference server 110 may store the dynamic image and the conference video file in an image database 170, and the electronic signature server 120 may store the signed file in the document database 160. In another embodiment, the electronic signature server 120 may also combine the dynamic image, the conference video file, and the signed file into one file to be uploaded to the document database 160.

Then, in step S435, the electronic signature server 120 combines the signature object with the assignment file to generate the signed file. Afterwards, in step S437, the electronic signature server 120 transmits the signed file to the document database 160.

In addition, after obtaining the signed file, the electronic signature server 120 may further transmits a signature completion notification to the remote conference server 110, so that the remote conference server 110 may update a progress status of the signature task.

After obtaining the signed file (or the combined file of the dynamic image, the conference video file, and the signed file), the electronic signature server 120 retrieves a specified feature from the signed file (or the combined file), and then transmits the specified feature to a certificate server. The specified feature includes a hash value or other information in the file. In addition, after obtaining a verified object from the certificate server, the electronic signature server 120 adds the verified object to the signed file. Here, the verified object is, for example, a digital certificate. A function of the digital certificate is to prove that the user listed in the certificate legally owns a public key listed in the certificate. The digital certificate includes a certificate number, a user name, the public key, an expiration date of the certificate, a time stamp, etc.

In an embodiment, the certificate server uses the public key infrastructure (PKI) technology to issue the digital certificate. The electronic signature server 120 adds the digital certificate to the completed signed file to protect the signed file from external changes or damages. Assuming that the signed file is a portable document format (PDF), if the signed file has been changed, a certificate exception notification will appear on a PDF reader.

The certificate server is, for example, a third-party certificate authority set up based on a PKI architecture. The PKI architecture includes users that are people or authorities using PKI, a certification authority (CA) that is people or authorities issuing the certificate, a repository that is a database for storing the certificate, and a registration authority (RA). After being checked by the third-party certificate authority, the signature object may be uniquely identified and non-repudiable.

In addition, the remote conference server 110 may activate the capturing function of the client APP 140 in the second electronic apparatus E2 in the process of performing the remote communication procedure, so as to perform the screen recording in a background to obtain the conference video file. In step S439, in response to an end of the remote communication procedure, the remote conference server 110 transmits the conference video file to the image database 170.

In addition, in order to ensure non-repudiation of the signed file, the electronic signature server 120 further uses blockchain technology, based on interaction between the client APP 140 and the electronic signature server 120, to calculate a verification value corresponding to each of interactive operations and transmit the verification value to a blockchain server to protect the signed file from the external changes or damages, and ensure integrity of the signed file during transmission. If the user has doubts about the signed file, the user may apply to the electronic signature server 120 for comparison with the signed file on the blockchain server for confirmation. The verification value is, for example, the hash value. The blockchain server adopts IOTA technology, which is a distributed ledger technology (DLT), overcoming inefficiency of the current blockchain design and introducing a new consensus method in a decentralized peer-to-peer solution.

Through the above embodiment, when the salesperson conducts videoconferencing with the user, before signing, the salesperson may ask the user to hold up the identity document in front of the camera for verification through the video connection. In addition, the salesperson may issue an instruction of screen recording through the main control APP 150, so that the remote conference server 110 may enable the screen recording at the same time. After the identity verified to be correct, the salesperson may specify the content of the contract and the corresponding contract template through the main control APP 150, and after the electronic signature server 120 establishes the signature task, and the signature task is transmitted to the client APP 140 through the remote conference server 110. Before the user completes the signature, the remote conference server 110 may further make a request.

In a process of the videoconferencing, the salesperson may guide the user to perform a signing operation through voice or text transmission, implementing a situation of videoconferencing like meeting and signing in person. After a video call is over, the finalized conference video file is saved in an assigned storage space (such as the image database 170) as required.

In addition, the electronic signature server 120 may further create an electronic audit trail to be stored in the document database 160 for downloading and checking. The electronic audit trail records a series of processing data. Through the electronic audit trail, the signature time of the signer and other changes may be clearly seen.

Based on the above, in the disclosure, through the integration of the video technology and the electronic signature technology, the electronic signature may be completed in the video process, solving the situation that relies heavily on the face-to-face signature. In addition, through the video recording storage and electronic audit trail, the integrity and non-repudiation of real people signing and the signature file are ensured.

What is claimed is:

1. An online signature system, comprising:
an electronic signature server; and
a remote conference server comprising a first processor and a first communication circuit that is coupled to the first processor and establishes a video connection between a first electronic apparatus and a second electronic apparatus, so that the first electronic apparatus and the second electronic apparatus perform a remote communication procedure through the remote conference server, wherein:
the electronic signature server comprises a second processor and a second communication circuit that is coupled to the second processor and establishes a communication with the second electronic apparatus,
in a process of performing the remote communication procedure:
the remote conference server transmits a signature task to the second electronic apparatus,
the signature task is implemented by using a uniform resource locator (URL) address,
the second electronic apparatus enables the signature task by using the URL address and is connected to the electronic signature server in response to the enabled signature task, and the electronic signature server transmits an assignment file to the second electronic apparatus, so that the URL address and the assignment file are displayed on a display of the second electronic apparatus,
in response to displaying the assignment file on the display of the second electronic apparatus, the second electronic apparatus receives an input through an input unit to generate a signature object associated with the assignment file and transmits the signature object to the electronic signature server, a dynamic image of a process of receiving the signature object through a client application installed in the second electronic apparatus is displayed in real time on a display of the first electronic apparatus, and
in response to receiving the signature object, the electronic signature server combines the signature object with the assignment file to obtain a signed file.

2. The online signature system according to claim 1, wherein
the second electronic apparatus determines whether the signature task is enabled by using the URL address and is connected to the electronic signature server when the signature task is enabled by using the URL address.

3. The online signature system according to claim 1, further comprising a document database, wherein
in the process of performing the remote communication procedure, in response to receiving a document notification from the first electronic apparatus, the remote conference server transmits the document notification to the document database, and transmits a request to the electronic signature server,
after receiving the document notification, the document database transmits signature-related data corresponding to the document notification to the electronic signature server,
the electronic signature server generates the assignment file and the signature task based on the signature-related data and a contract template, and transmits the signature task to the remote conference server based on the request,
in response to receiving the signature task, the remote conference server transmits the signature task to the first electronic apparatus to confirm the signature task through the first electronic apparatus, and transmit the signature task to the second electronic apparatus after the signature task is confirmed through the first electronic apparatus.

4. The online signature system according to claim 3, wherein the electronic signature server transmits the signed file to the document database after obtaining the signed file.

5. The online signature system according to claim 1, wherein
the remote conference server activates a capturing function of the client application in the second electronic apparatus in the process of performing the remote communication procedure, thereby performing screen recording to obtain a conference video file,
in response to an end of the remote communication procedure, the remote conference server transmits the conference video file to an image database.

6. The online signature system according to claim 5, wherein
the dynamic image is transmitted to the remote conference server, and
the remote conference server transmits the dynamic image and the conference video file to the electronic signature server, and associates the dynamic image, the conference video file, and the signed file through the electronic signature server.

7. The online signature system according to claim 1, wherein the electronic signature server is configured to
retrieve a specified feature from the signed file;
transmit the specified feature to a certificate server to obtain a verified object from the certificate server; and
add the verified object to the signed file.

8. The online signature system according to claim 1, wherein the remote conference server transmits connection information to the first electronic apparatus and the second electronic apparatus respectively in response to receiving a conference invitation through the first electronic apparatus, so that the first electronic apparatus and the second electronic apparatus perform the remote communication procedure.

9. The online signature system according to claim 1, wherein before transmitting the signature task to the second electronic apparatus, the remote conference server transmits a verification code to an assigned address through a short message service or an email service, in response to a response received from the second electronic apparatus conforming to the verification code, the remote conference server transmits the signature task to the second electronic apparatus, in response to the response received from the second electronic apparatus not conforming to the verification code or not receiving the response, the remote conference server prohibits transmitting the signature task to the second electronic apparatus.

10. The online signature system according to claim 1, wherein in the process of performing the remote communication procedure, the remote conference server issues an instruction to activate an image capturing function on the second electronic apparatus to obtain a verification image through the image capturing function.

11. The online signature system according to claim 1, wherein after obtaining the signed file, the electronic signature server transmits a signature completion notification to the remote conference server, so that the remote conference server updates a progress status of the signature task.

12. An online signature method, comprising:

establishing a video connection between a first electronic apparatus and a second electronic apparatus through a remote conference server, so that the first electronic apparatus and the second electronic apparatus perform a remote communication procedure through the remote conference server;

in a process of performing the remote communication procedure:

transmitting a signature task to the second electronic apparatus through the remote conference server, wherein the signature task is implemented by using a uniform resource locator (URL) address, enabling the signature task by using the URL address through the second electronic apparatus, connecting the second electronic apparatus to an electronic signature server in response to the enabled signature task and transmitting an assignment file to the second electronic apparatus by the electronic signature server, so that the URL address and the assignment file are displayed on a display of the second electronic apparatus, in response to displaying the assignment file on the display of the second electronic apparatus, the second electronic apparatus receiving an input through an input unit to generate a signature object associated with the assignment file and transmitting the signature object to the electronic signature server, displaying, in real time, a dynamic image of a process of receiving, through a client application installed in the second electronic apparatus, the signature object on a display of the first electronic apparatus, and combining the signature object with the assignment file through the electronic signature server to obtain a signed file.

13. The online signature method according to claim 12, wherein after transmitting the signature task to the second electronic apparatus through the remote conference server, the method further comprises:

determining whether the signature task is enabled by using the URL address through the second electronic apparatus, so that when the signature task is enabled by using the URL address, the second electronic apparatus is connected to the electronic signature server.

14. The online signature method according to claim 12, wherein in the process of performing the remote communication procedure, the method further comprises:

in response to receiving a document notification from the first electronic apparatus, transmitting the document notification to a document database through the remote conference server, and transmitting a request to the electronic signature server;

transmitting signature-related data corresponding to the document notification to the electronic signature server through the document database;

generating the assignment file and the signature task based on the signature-related data and a contract template through the electronic signature server, and transmitting the signature task to the remote conference server based on the request; and in response to the remote conference server receiving the signature task, transmitting the signature task to the first electronic apparatus to confirm the signature task through the first electronic apparatus, and transmitting the signature task to the second electronic apparatus after confirming the signature task.

15. The online signature method according to claim 14, wherein after obtaining the signed file, the method further comprises:

transmitting the signed file to the document database through the electronic signature server.

16. The online signature method according to claim 12, wherein in the process of performing the remote communication procedure, the method further comprises:

activating a capturing function of the client application in the second electronic apparatus in the process of performing the remote communication procedure through the remote conference server, thereby performing screen recording to obtain a conference video file; and in response to an end of the remote communication procedure, transmitting the conference video file to an image database through the remote conference server.

17. The online signature method according to claim 16, wherein in the process of performing the remote communication procedure, the method further comprises:

transmitting the dynamic image to the remote conference server by the first electronic apparatus; and transmitting the dynamic image and the conference video file to the electronic signature server through the remote conference server, and associating the dynamic image, the conference video file, and the signed file through the electronic signature server.

18. The online signature method according to claim 12, wherein after obtaining the signed file, the method further comprises performing the following steps through the electronic signature server:

retrieving a specified feature from the signed file;

transmitting the specified feature to a certificate server to obtain a verified object from the certificate server; and adding the verified object to the signed file.

19. The online signature method according to claim 12, wherein establishing the video connection between the first electronic apparatus and the second electronic apparatus through the remote conference server, so that the first electronic apparatus and the second electronic apparatus perform the remote communication procedure comprises:

transmitting a conference invitation to the remote conference server through the first electronic apparatus, so that the remote conference server transmits connection information to the first electronic apparatus and the second electronic apparatus respectively, thereby performing the remote communication procedure.

20. The online signature method according to claim 12, wherein before transmitting the signature task to the second electronic apparatus through the remote conference server, the method further comprises performing the following steps through the remote conference server:

transmitting a verification code to an assigned address through a short message service or an email service;

wherein in response to a response received from the second electronic apparatus conforming to the verification code, the remote conference server transmits the signature task to the second electronic apparatus, in response to the response received from the second electronic apparatus not conforming to the verification code or not receiving the response, the remote conference server prohibits transmitting the signature task to the second electronic apparatus.

21. The online signature method according to claim 12, wherein in the process of performing the remote communication procedure, the method further comprises:

activating an image capturing function through the second electronic apparatus to obtain a verification image through the image capturing function.

22. The online signature method according to claim 12, wherein after obtaining the signed file, the method further comprises:

transmitting a signature completion notification to the remote conference server through the electronic signature server, so that the remote conference server updates a progress status of the signature task.

23. An electronic apparatus for an online signature, comprising:

a display;

a storage comprising a client application; and a processor coupled to the storage and configured to execute the client application to be connected to a remote conference server, so that the electronic apparatus and another electronic apparatus perform a remote communication procedure through the remote conference server; and in a process of performing the remote communication procedure, the processor is further configured to execute the client application to:

receive a signature task from the remote conference server, wherein the signature task is implemented by using a uniform resource locator (URL) address, enable the signature task by using the URL address, be connected to an electronic signature server in response to the enabled signature task and display the URL address and an assignment file that is transmitted by the electronic signature server on the display, and in response to displaying the assignment file on the display, receive a signature object associated with the assignment file and transmit the signature object to the electronic signature server, thereby causing the another electronic apparatus to display, in real time, a dynamic image of a process of receiving the signature object through a client application installed in the electronic apparatus and causing the electronic signature server to combine the signature object with the assignment file to obtain a signed file.

24. The electronic apparatus for the online signature according to claim 23, wherein the processor is configured to execute the client application, and confirm a conference invitation through the client application in response to receiving a reservation notification from the remote conference server, so that the remote conference server transmits connection information to the electronic apparatus and the another electronic apparatus respectively.

25. The electronic apparatus for the online signature according to claim 23, wherein the processor is configured to execute the client application to activate an image capturing function in the process of performing the remote communication procedure to obtain a verification image through the image capturing function.

\* \* \* \* \*